G. A. TOWNSEND, Jr.
MAUSOLEUM.
APPLICATION FILED MAY 27, 1910.
1,050,256.
Patented Jan. 14, 1913.
5 SHEETS—SHEET 1.
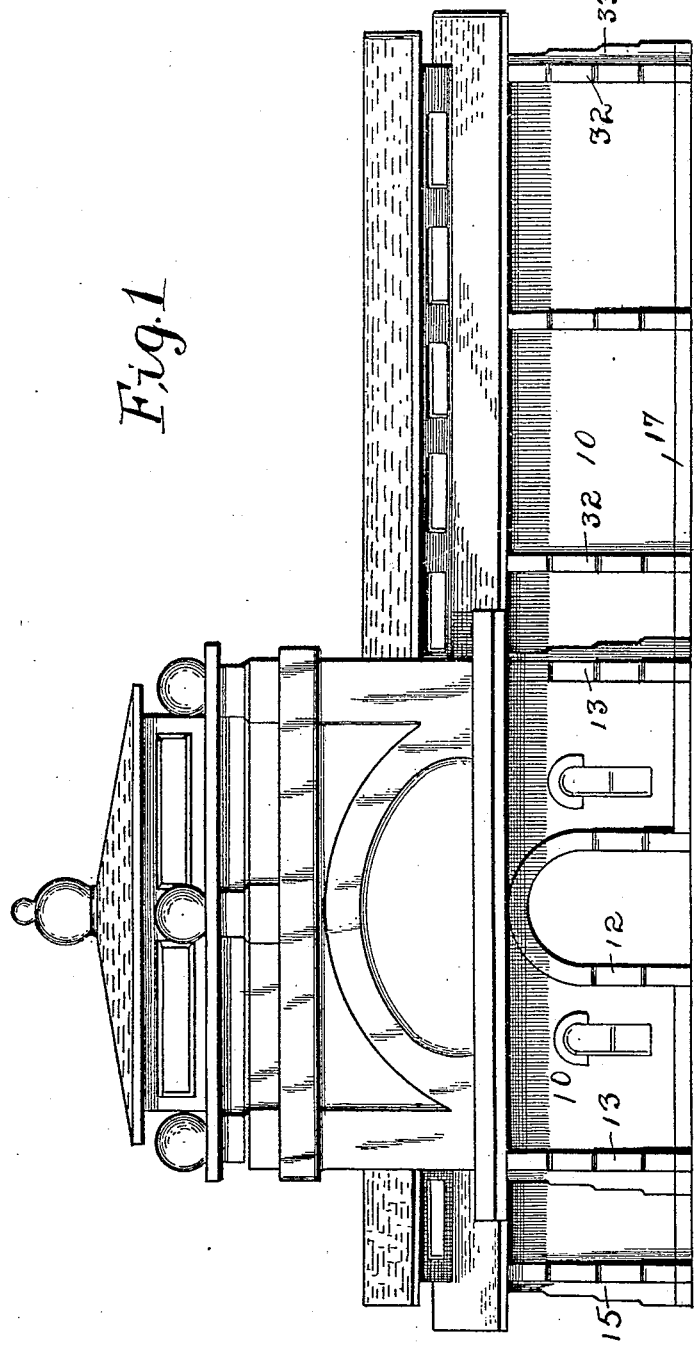
Witnesses
A. G. Hague
George Mankle
Inventor
Geo. A. Townsend Jr.

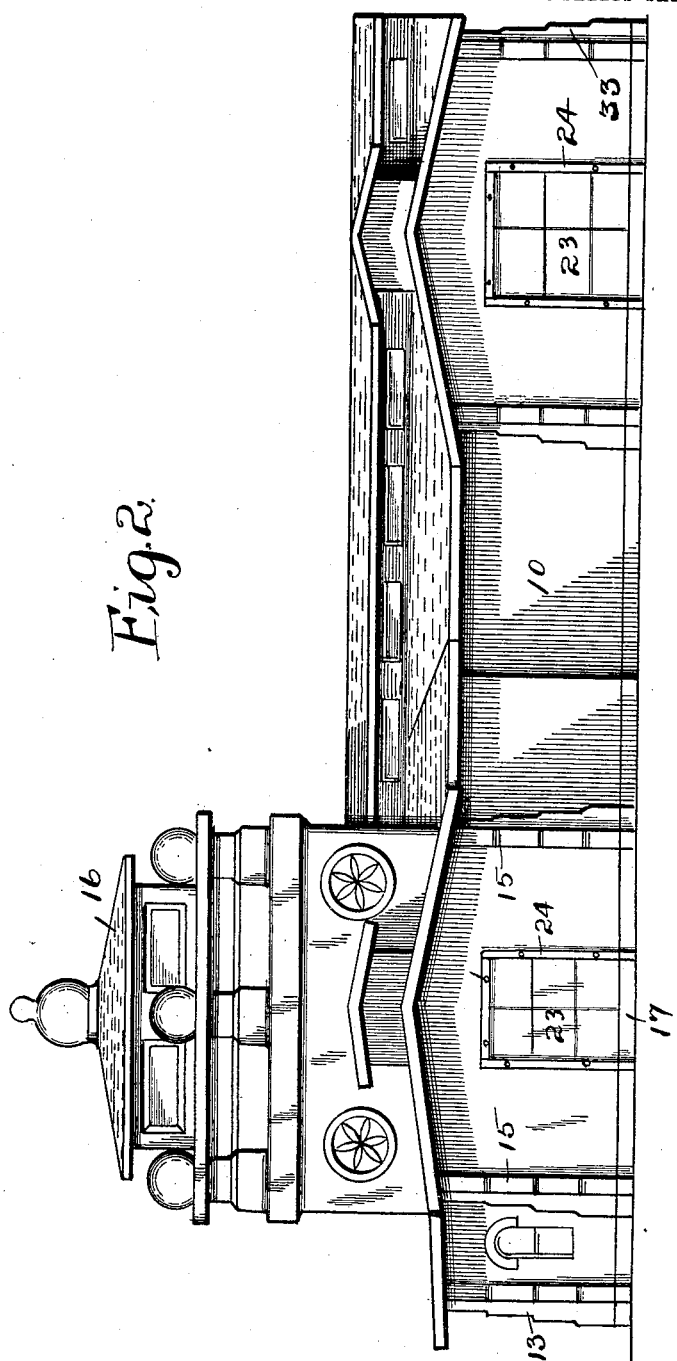

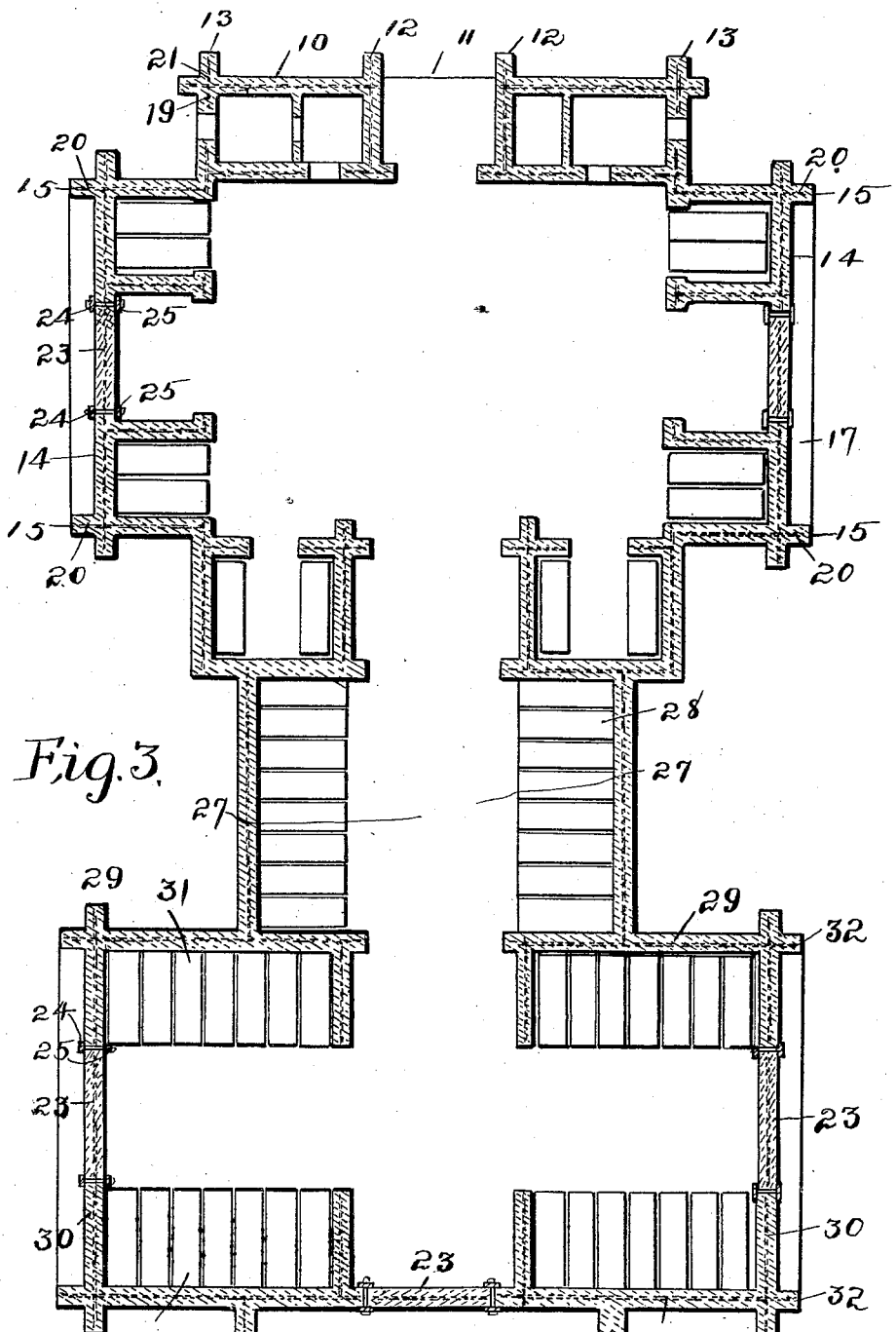

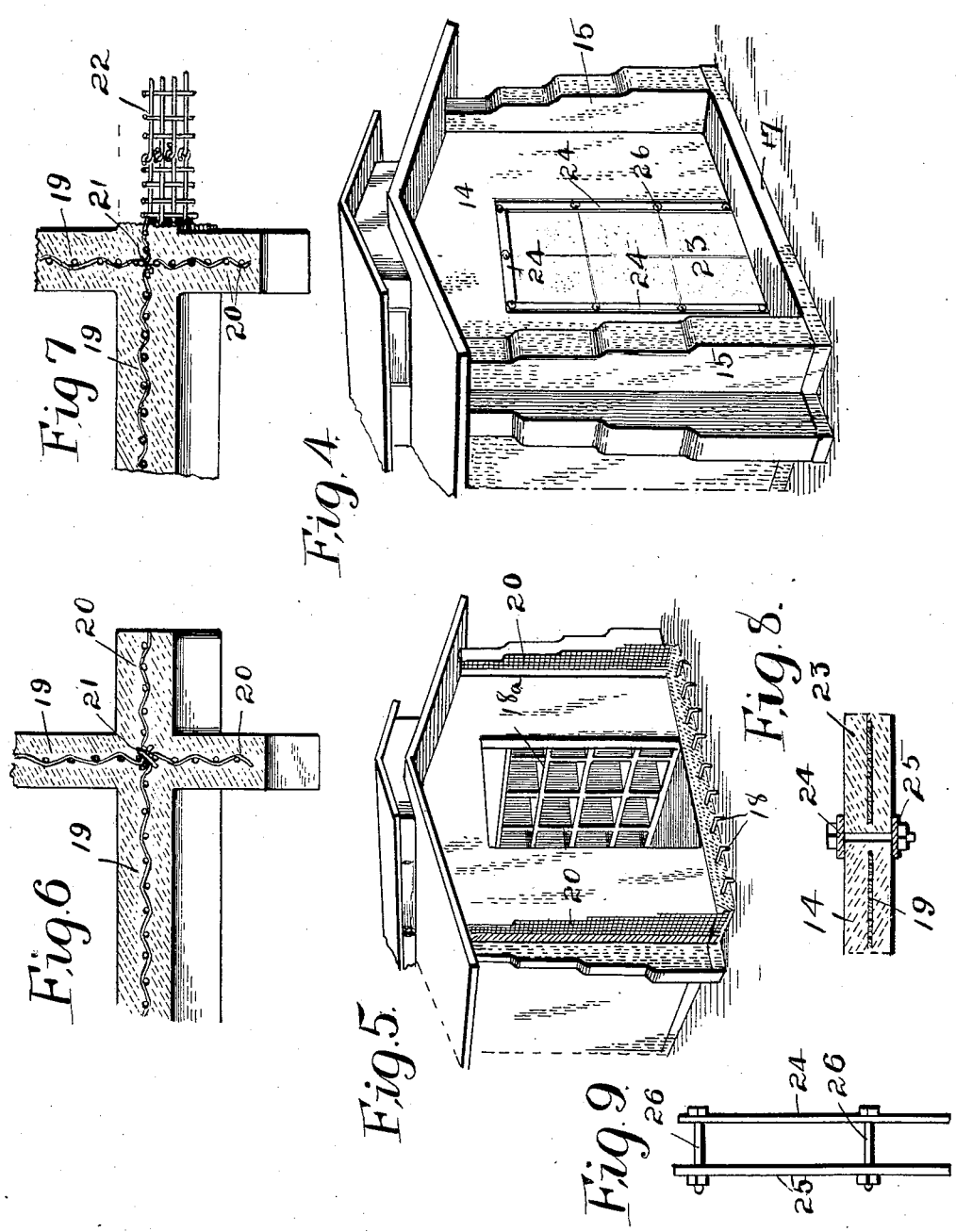

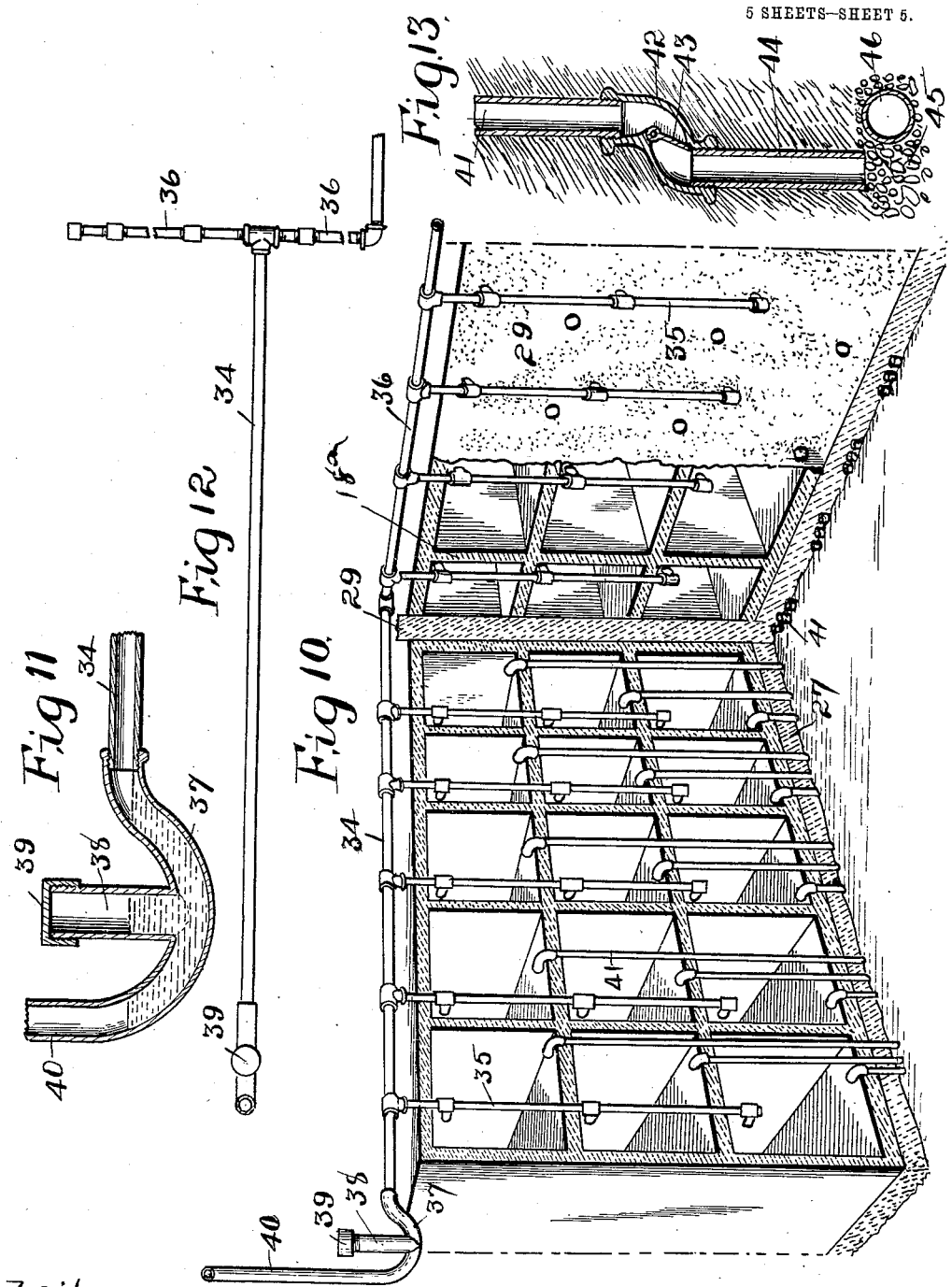

UNITED STATES PATENT OFFICE.

GEORGE ALFRED TOWNSEND, JR., OF FORT WAYNE, INDIANA, ASSIGNOR TO FRED L. MAYTAG.

MAUSOLEUM.

1,050,256.        Specification of Letters Patent.      Patented Jan. 14, 1913.

Application filed May 27, 1910. Serial No. 563,714.

*To all whom it may concern:*

Be it known that I, GEORGE ALFRED TOWNSEND, Jr., a citizen of the United States, residing at Fort Wayne, in the county of Allen and State of Indiana, have invented a certain new and useful Mausoleum, of which the following is a specification.

The object of my invention is to provide a mausoleum comprising a chapel portion, one or more hallway catacomb portions and one or more catacomb rooms so arranged that the structure may be formed complete originally with a single chapel portion, catacomb hall portion and catacomb room portion provided with suitable vent pipes for gas and drain pipes for liquids, and so arranged and constructed that the hall portions and room portions may be extended indefinitely on three sides of the chapel or on three sides of either room portion in such a manner as to form a complete and finished mausoleum after the addition of any one or more of said hall and room portions and so arranged that the architectural scheme will be uniform throughout and that the passageways through the halls and rooms will be of uniform size and arranged on straight lines and also to provide a structure of this kind in which the vent pipes for gas and liquids may also be extended to accommodate the added hall and room sections without change in the general plan or arrangement of any of the pipes and without the removal or replacement of any of the pipes previously located.

My invention consists in the construction, arrangement and combination of the chapel section, the hallway and room sections and the arrangement and combination of the various walls and buttresses and the reinforcing devices therein and also in the arrangement of the various pipes, traps, etc., whereby the objects contemplated are attained, as hereinafter more fully set forth, pointed out in my claims and illustrated in the accompanying drawings, in which:

Figure 1 shows a front elevation of a mausoleum embodying my invention showing the chapel and a catacomb hallway at one side thereof. Fig. 2 shows a side elevation of a mausoleum embodying my invention showing a catacomb hallway and a catacomb room at the rear thereof. Fig. 3 shows a horizontal, sectional view of a mausoleum embodying my invention and comprising a chapel, a catacomb hallway and a catacomb room at the end of said hallway. Fig. 4 shows a perspective view of a finished end of a catacomb hallway section. Fig. 5 shows a similar view with the buttresses and floor cut away ready to receive an extension catacomb room and illustrating the reinforcing materials projecting from the side walls and floor of the catacomb hallway. Fig. 6 shows a detail, sectional, perspective view illustrating the arrangement of the reinforcement in the walls and buttresses. Fig. 7 shows a like view with one of the buttress members broken away and an extension of the reinforcement applied thereto to illustrate the means of connecting the reinforcement of a finished section with the reinforcement of a new section. Fig. 8 shows a detail, sectional view illustrating the means for supporting the sections for closing the passageway portions in the permanent wall portions. Fig. 9 shows a detail, edge view of the metal plates and bolts for connecting temporary wall portions of the passageway with the permanent wall members. Fig. 10 shows a perspective view, partly in section, of two catacomb portions at right angles to each other to illustrate the arrangement of the pipes for carrying off gas and liquids from the crypts. Fig. 11 shows an enlarged, detail, sectional view of one of the deodorizing and disinfecting traps. Fig. 12 shows a plan view of a pipe connected with the trap shown in Fig. 11 and illustrating the arrangement of the pipes, whereby they may be extended indefinitely when new catacomb sections are added, and Fig. 13 shows an enlarged, detail, sectional view of one of the drainage pipes to illustrate the one-way trap therein.

Referring to the accompanying drawings, I shall first describe the chapel section which is preferably made rectangular in cross section and which comprises a front wall 10 having an entrance opening 11 and having buttresses 12 at the sides of the entrance opening and also having buttresses 13 near the side edges of the front. The remaining three sides of the chapel section are each provided with a side wall 14, a passageway opening at the center of the side wall and two buttresses 15 near the ends of said side wall. I also provide, preferably, a suitable ornamental dome or tower 16 for the chapel section.

Referring to Figs. 4 and 5, I have illustrated in detail the construction of the side walls 14 of the chapel section. In finishing the side wall, I preferably extend the floor 17 to a point flush with the lower ends of the buttresses 15 and in said floor portion I provide a number of reinforcing rods or hooks 18. These reinforcing rods or hooks are wholly concealed by the extended floor portion and when it is desired to apply additional sections to the chapel portion the concrete material forming the floor is cut away to permit the reinforcing rods or hooks to project outwardly away from the main floor, as shown in Fig. 5.

In the construction of the walls and buttress portions, I provide for reinforcing and connecting new sections as follows: As shown in Figs. 6 and 7 of the drawings, the walls are provided with reinforcing material 19 such, for instance, as expanded material, which material runs through the wall and then is bent at right angles at 20 to extend through the adjacent buttress and at the point where the reinforcing material comes together at the corner of the wall, I connect the two parts of the reinforcing material by means of rivets 21 or other suitable fastening devices. When it is desired to add a new section the concrete material of the buttresses 15 is broken away to expose the reinforcing material 20 and then the reinforcing material for the new wall is connected with the expanded reinforcing material 19 before the new wall is built, as clearly illustrated in Fig. 7, the added reinforcing material being indicated by the numeral 22. The means for temporarily closing the passageways through the end walls comprises a wall member 23 made of reinforced concrete and of a size and shape to loosely fit within the passageway opening in the wall. After the said wall section 23 is placed in position I place a frame composed of two metal plates 24 and 25 on opposite sides of the permanent wall and the wall member 23 and I then extend bolts 26 through said plates and through the spaces between the permanent walls and the temporary wall member to thereby firmly and securely hold the temporary wall member in position and to securely conceal the spaces between the permanent wall and the temporary wall member. By this arrangement I provide a temporary wall member that may be readily, quickly and easily removed and again set up in another location when it is desired to add a section to my improved structure and at the same time the temporary wall is arranged so that it will last indefinitely and form a permanent wall when necessary.

As shown in Fig. 3, the structure as originally made may comprise a single catacomb hall 27 comprising straight side walls and roof and being designed to receive catacombs 28 at its sides so arranged as to leave a passageway through its center of suitable width. Joined to the end of said hallway section is a catacomb room section which comprises side walls 29 and end walls 30. The said catacomb room section is made of such width that a passageway may extend through it and catacombs 31 may be placed on the sides thereof with sufficient room for a passageway between them of the same width as the passageway through the catacombs in the hallway portions. I provide on the sides 30 the buttresses 32 which correspond in construction and in arrangement with the buttresses 15, and on the rear of the catacomb room, I provide buttresses 33 which also correspond in size and arrangement with the buttresses 32 so that an additional hallway section may be attached either to the sides or end of the room section. By means of this general arrangement of the chapel section, the hallway sections and the room sections, it is obvious that a mausoleum of comparatively small capacity may first be constructed and later additions may be made to it as needed and that the structure may be extended in any direction and at the same time the original architectural scheme may be carried out and the passageways through the various hall and room portions will be of uniform size and shape and, furthermore, a structure is provided which is strengthened and reinforced throughout and which presents a finished appearance after the addition of any one or more hall sections or room sections.

The means for ventilating and draining the catacombs comprises a main vent pipe 34 arranged above and in the rear of the catacombs and having connected with it a series of downwardly extended pipes 35, each of which has a branch to enter the several crypts in a vertical row of the catacombs. Branch pipes 36 are connected to the main 34 and may be extended in any direction so that when additions of new hall sections or room sections are made it is only necessary to connect a branch pipe 36 with the main 34 in the ordinary way to provide for ventilating the added catacombs. At the discharge end of the main 34 is a deodorizing and disinfecting trap comprising a substantially U-shaped body portion 37 having an upright branch 38 at its central portion and a screw cap 39 on top of said branch. The end of the trap opposite from the pipe 34 extends upwardly at 40 and is projected to an elevated point of discharge into the outside atmosphere. The cap 39 is removed and a quantity of liquid formaldehyde or other deodorizing and disinfecting solution is placed therein so that all gases arising within the crypts must pass through the pipe 35 and through the liquid solution in the trap before escape through the pipe 40.

At the rear of each of the crypts is a drainage pipe 41 which extends downwardly below the ground surface and at a point beneath the ground it is provided with an elbow 42 in which there is a hinged valve 43 that normally remains closed. It may however be opened by the pressure of liquid upon it to permit liquid to pass downwardly. It is however closed against the upward movement of liquid or gases by means of the valve 43. Below the elbow is a pipe 44 which preferably extends into a gravel bed 45 provided with a drain tile 46. By means of this arrangement it is obvious that all gases arising from any of the crypts will first be disinfected and deodorized before escaping to the outside atmosphere and that all liquids within any of the crypts will pass downwardly through the drain pipes to a point below the ground surface.

In practice it is desirable that a complete architectural plan for a mausoleum of comparatively large capacity may be made to thereby provide a structure of neat and ornamental appearance. It is also desirable that a portion only of the complete mausoleum may be constructed first and that additions may be made thereto from time to time to meet the requirements of use. For this reason I have provided a mausoleum made of sections so arranged that any desired number of additional sections may be applied to the original structure from time to time and each section when applied will provide a finished structure of neat and ornamental appearance that conforms in architectural features to the other parts of the structure. By providing a catacomb hallway section having a central passageway and spaces for catacombs on its sides, and also having reinforced buttresses and floor members extended beyond its end, I provide a section that may be added to any desired part of the original structure to accommodate an additional number of catacombs and that will present a completed appearance in conforming with the rest of the structure wherever it is applied. By providing a catacomb room section having central passageways extended both ways through it and having four catacomb sections arranged at the side of the longer passageway and by having door openings and reinforced buttresses at the sides and ends of said section I provide a mausoleum section that may be added to any of the hallway sections to provide additional catacomb spaces and that will present a finished and ornamental appearance wherever it is added to the rest of the structure.

The advantage of having the various sections of the mausoleum provided with passageway openings and providing detachable wall sections to fit into said openings is that wherever said detachable wall section is provided the section will be complete and tightly closed and it will present a finished appearance and at the same time the removable section may be readily, and easily taken away at any time and used in connection with the opposite end of another section added to the first so that the detachable wall may be used over and over again as the structure is enlarged by the addition of new sections. Furthermore by arranging the vent pipes in the manner shown and described, it is possible to conveniently and easily add additional catacomb sections as desired without disturbing any of the vent pipes in the original structure and all that is necessary in such cases is to connect the main vent of the added section with the main vent pipe of the adjoining section so that the discharge pipe of the original structure and the disinfecting and deodorizing trap therein may be employed for use with the other sections added to the structure.

I claim as my invention:

1. In a mausoleum, the combination of a reinforced concrete wall provided with a passage-way opening, a reinforced concrete wall member fitted into said opening, a frame for said wall member comprising metal plates arranged on opposite sides of said wall and said wall member, said plates over-lapping the edges of said wall and wall member, and readily removable connecting devices extending through said plates and through the space between the wall and the wall member for securely holding the wall member in place.

2. A mausoleum comprising a chapel section at the front, a catacomb room section at the rear, a catacomb hall section arranged between said other sections, catacombs arranged transversely in said hall section so as to leave a passage-way which connects the chapel section with the catacomb room section, catacombs arranged in said room section so as to provide a passage-way in continuation of said first-mentioned passage-way and also to provide a second passage-way running transversely of the continued passage-way, readily removable wall members held within the walls of said room section at each end of said transverse passage-way and at the end of said continued passage-way to provide passage-way openings when said wall members are removed, and buttresses spaced apart from said passageway opening and containing reinforcing devices, said buttresses being capable of being broken away to expose said reinforcing devices so that these may be connected with the reinforcing devices of an additional mausoleum section, the floor portion of said catacomb room section being projected beyond the outer wall and provided with reinforcing devices, said floor being so arranged that it may be broken away to expose said reinforcing devices for the purpose set forth.

3. In a mausoleum, the combination of a reinforced concrete wall provided with a passage-way opening, a reinforced concrete wall member fitted into said opening, a frame for said wall member comprising metal plates arranged on opposite sides of said wall and said wall member, said plates overlapping the edges of said wall and wall member, readily removable connecting devices extending through said plates and through the space between the wall and the wall member for securely holding the wall member in place, and buttresses spaced apart from said passageway opening and containing reinforcing devices, said buttresses being capable of being broken away to expose said reinforcing devices so that these may be connected with the reinforcing devices of an additional mausoleum section, the floor portion of said catacomb room section being projected beyond the outer wall and provided with reinforcing devices, said floor being so arranged that it may be broken away to expose said reinforcing devices for the purpose set forth.

GEORGE ALFRED TOWNSEND, Jr.

Witnesses:
GEORGE MANKLE,
W. R. LANE.

---

Copies of this patent may be obtained for five cents each, by addressing the "Commissioner of Patents, Washington, D. C."